C. F. JENKINS.
MOTION PICTURE APPARATUS.
APPLICATION FILED JAN. 8, 1912.
1,091,343.
Patented Mar. 24, 1914.
2 SHEETS—SHEET 1.
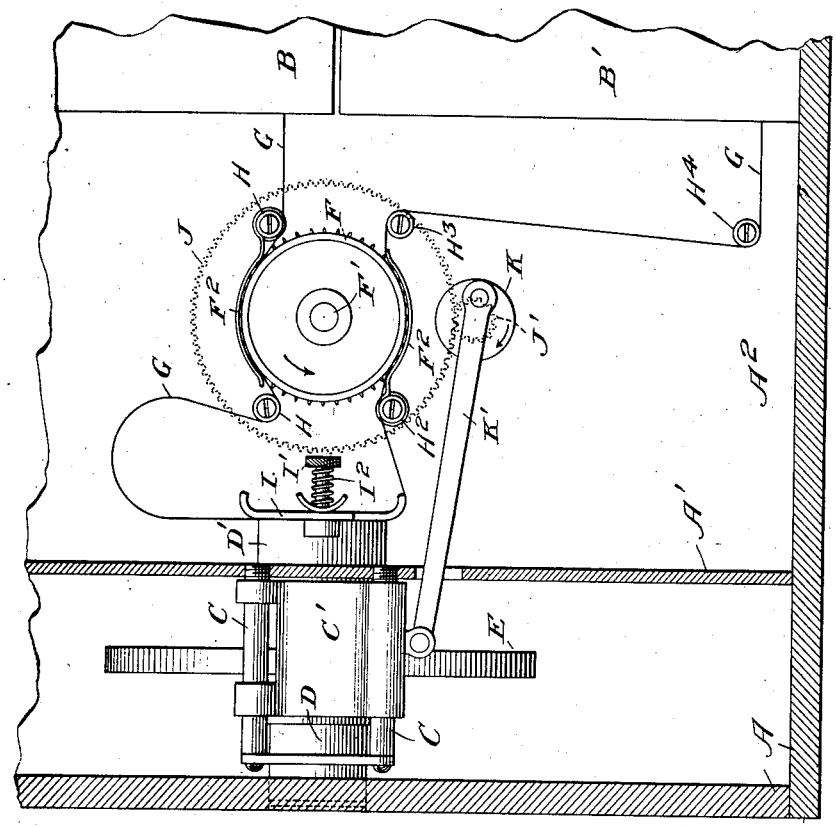
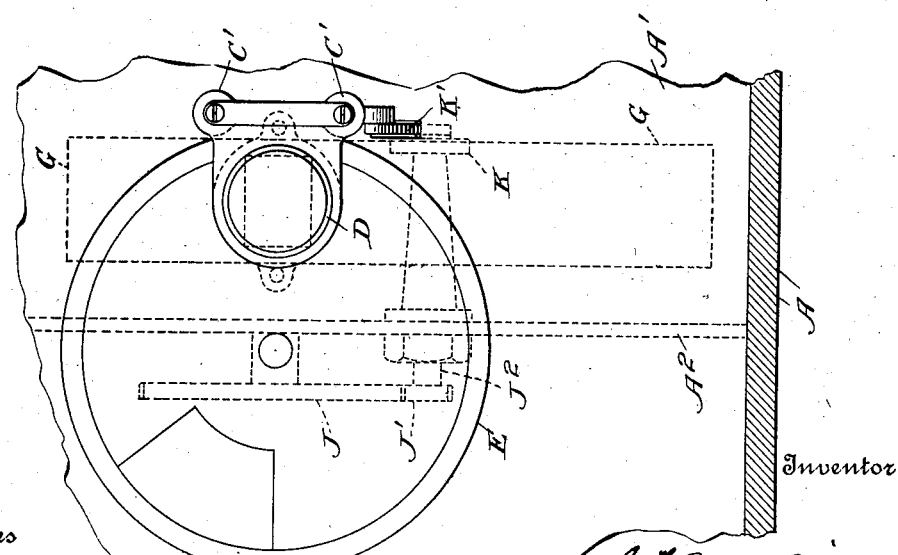

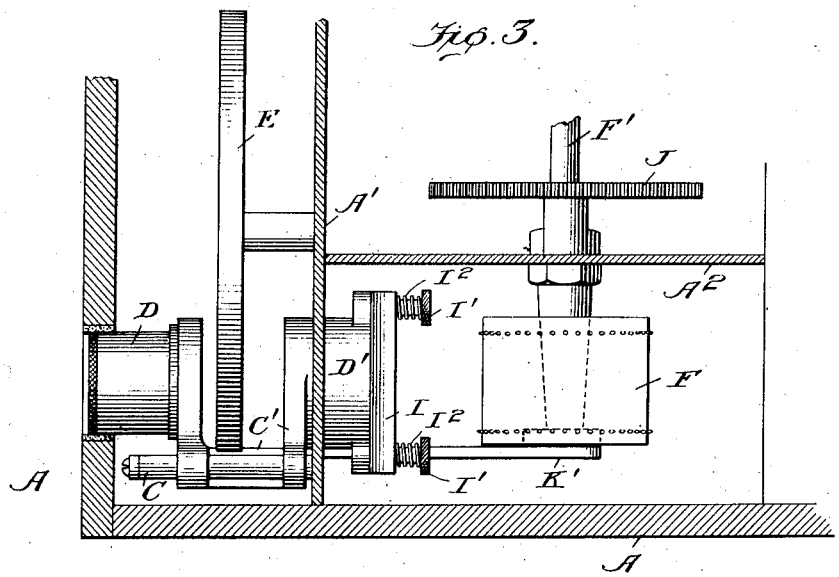
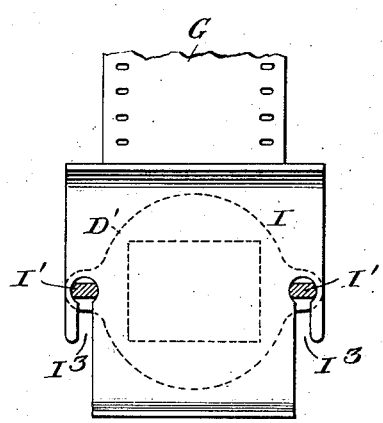

UNITED STATES PATENT OFFICE.

CHARLES FRANCIS JENKINS, OF WASHINGTON, DISTRICT OF COLUMBIA.

MOTION-PICTURE APPARATUS.

1,091,343. Specification of Letters Patent. Patented Mar. 24, 1914.

Application filed January 8, 1912. Serial No. 669,998.

*To all whom it may concern:*

Be it known that I, CHARLES FRANCIS JENKINS, a citizen of the United States, residing at Washington, in the District of Columbia, have invented certain new and useful Improvements in Motion-Picture Apparatus, of which the following is a specification, reference being had therein to the accompanying drawing.

The object of this invention is to provide a simple motion picture camera that shall be unusually accurate in operation, locating the pictures with precision, and not materially affected in accuracy by any wear of the parts. These ends are attained by fixing the distance of the film from the lens at the time of exposure and then moving the lens and film together along the line of the axis of the lens or perpendicularly to the plane of that portion of the film in position for exposure. The film is fed transversely to the axis of the lens, at proper times by novel and advantageous means.

In the accompanying drawings, Figure 1 is a front elevation of a portion of a camera embodying the invention. Fig. 2 is an elevation, looking from the right in Fig. 1. Fig. 3 is a plan view of the same devices. Fig. 4 shows in elevation the rear face of a film-pressing plate.

In these figures, A represents a camera box, A', A² transverse partitions therein, and B, B' film receptacles within the box. Upon fixed rods or ways, C, in the front portion of the box is mounted a rigid frame C' to which are rigidly attached a lens tube D, sliding in a felt lined aperture in front of the box, and an alining tube D' which in like manner moves back and forth in a corresponding opening in the partition A'. Between the tubes D, D' lies a shutter E which is rotated at proper speed by devices not shown. In the rear of the partition A' is mounted a sprocket drum F actuated by a shaft F' to draw film G from the receptacle B and to return it after exposure to the receptacle B', the outgoing portion of the film being held against the upper side of the drum by a spring F² and the returning portion being pressed against the lower side by a like device. The film in its course passes around small rollers H, H', H², H³, H⁴ and is held flat against the end face of the tube D' by a guide plate I mounted on thumb screws I', carried by the tube, and pressed toward the tube by springs I². The screws are flattened as seen in Fig. 4 and the plate is provided with slots I³ so formed that the plate is readily lifted and detached when the screws are given a quarter turn from the position indicated in that figure. The shaft F' bears a gear, J, meshing with a pinion J' upon a shaft J² which carries a crank-plate K connected by a pitman K' to the frame C' carrying the lens tube and the tube D', which are thus caused to move back and forth along the line of the axis of the lens.

It follows from the construction, the parts being properly proportioned, that when the shaft is rotated uniformly, the film will be continuously advanced by the drum and will be fed intermittently past the end of the tube D', and further that it will be exposed at a moment when it is at rest as to longitudinal advance, the shutter opening then alining with the two tubes. The film feeding parts being in the positions indicated in Fig. 2, rotation of the shaft F', gear J and drum F will obviously tend to increase the slack above the plate I and to draw the film, to an equal extent, from the lower side of that plate, but a slight rotation of the gear causes a half rotation of the crank-plate and carries the frame, tubes and plate forward quickly yet with gradually increasing and similarly decreasing speed, the forward movement being barely more than enough to bring the film against the plate A' and to cause the springs to yield slightly thereby arresting the film at the end of each feeding stroke when it is at exactly a predetermined distance from the sprocket drum, thus insuring desirable accuracy in feeding at high speed. As the film cannot be drawn from the lower side of the drum, this forward movement pulls down from the slack above a length of film substantially equal to the distance through which the tubes move plus the length of film fed rearward by the drum during this short interval. The plate and the other parts now move in the contrary direction and the rate quickly exceeds the rate of the feed by the drum and hence for a short period there is no slipping movement or feed movement of the film under the plate or across the axis of the lens, and the parts are so arranged that at this moment the aperture in the shutter exposes the film while both tubes and this exposed portion of the film are moving rearward with no relative displacement whatever until after the shutter terminates the exposure.

It is obvious that the distance of the lens from the subject being photographed varies as the lens is carried back and forth, but the distance of the subject from the lens is ordinarily so great, relatively, that this variation is negligible or has no appreciable effect. It is also evident that the construction avoids independent or separate movements which must be accurately coördinated, that mounting all moving parts upon mutually supporting plates or partitions at right angles to each other and extending across the casing gives very desirable rigidity and allows using in extremely small space the shutter behind the lens and the single sprocket drum for both feeds, that few gears are employed, and that ordinary wear of the reciprocating parts or the parts causing reciprocation has no effect upon the feed.

What I claim is:

1. The combination with a closed casing having a rigid transverse diaphragm, of a lens tube arranged for sliding longitudinally in an aperture in said casing, an alining film guide tube arranged for sliding similarly in an aperture in said diaphragm, means for reciprocating the two tubes together, means for yieldingly holding a transverse film strip at the rear end of the guide tube, and means for holding that portion of the strip which has passed the guide tube against the pull of the latter in its forward movements; whereby the film is advanced with respect to the guide tube during each forward movement of the latter.

2. The combination with a closed casing internally divided by a fixed transverse diaphragm, of a lens tube and a connected alining film guide tube arranged to fit and slide in apertures in the casing and diaphragm, respectively, a shutter arranged for rotation between said tubes, means for axially reciprocating the two tubes, means for yieldingly holding a film strip against the inner end of the guide tube, means for directing film to said holding means, and means for feeding film from said holding means to take up slack due to rearward movement of the guide tube and for holding this portion of the film against the pull thereon when the guide tube moves forward.

3. The combination with a lens reciprocating in its own axial line, of a film guide reciprocating with the lens and arranged for yielding slightly when, in moving forward, it meets strong resistance, and means for positively and uniformly arresting the forward movement of the guide slightly before it reaches the limit to which it would otherwise advance, whereby the guide and film therein always move forward to the same point, precisely, irrespective of ordinary wear of parts causing reciprocation.

4. The combination with a casing of a lens tube fitting in an aperture in the casing, a film guide tube alining with the lens tube, at some distance in the rear thereof and rigidly connected thereto, means for reciprocating said tubes, means whereby such reciprocation causes film to pass intermittently across the inner end of the guide tube, and an upwardly detachable plate spring-pressed on each side against the inner end of the guide tube.

5. The combination of a lens and film guide reciprocating together in the axial line of the lens, means for frictionally holding in said guide a film strip transverse to said line, and means for taking up at one side of said guide the slack in the film due to rearward movement of the latter and holding the same portion of the film against contrary movement while the guide moves forward; whereby each forward movement of the guide causes the film to slip therein, presenting a fresh portion in said axial line.

In testimony whereof I affix my signature in presence of two witnesses.

CHARLES FRANCIS JENKINS.

Witnesses:
ROBERT CRAIG GREENE,
JAMES L. CRAWFORD.